United States Patent [19]

Kawakami et al.

[11] Patent Number: 5,179,194
[45] Date of Patent: Jan. 12, 1993

[54] PROCESS FOR PRODUCTION OF POLYARYLENESULFIDES

[75] Inventors: Yukichika Kawakami; Yo Iizuka; Takayuki Katto, all of Iwaki, Japan

[73] Assignee: Kureha Kagaku Kogyo K.K., Tokyo, Japan

[21] Appl. No.: 640,747

[22] Filed: Jan. 14, 1991

[30] Foreign Application Priority Data

Jan. 19, 1990 [JP] Japan .................................. 2-8167

[51] Int. Cl.$^5$ ............................................. C08G 75/14
[52] U.S. Cl. .................................... 528/388; 528/370; 528/371; 528/373; 528/374; 528/381; 528/384
[58] Field of Search .............. 528/388, 373, 374, 381, 528/384, 370, 371; 525/537; 422/240

[56] References Cited

U.S. PATENT DOCUMENTS

| | | | |
|---|---|---|---|
| 3,354,129 | 11/1967 | Edmonds et al. | 528/388 |
| 3,869,433 | 3/1975 | Campbell | 528/388 |
| 3,919,177 | 11/1975 | Campbell | 528/388 |
| 4,089,847 | 5/1978 | Edmonds, Jr. et al. | 528/374 |
| 4,116,947 | 9/1978 | Edmonds, Jr. et al. | 528/388 |
| 4,373,091 | 2/1983 | Edmonds, Jr. et al. | 528/481 |
| 4,588,789 | 5/1986 | Scoggins et al. | 525/537 |
| 4,613,654 | 9/1986 | Katto et al. | 528/388 |
| 4,645,826 | 2/1987 | Iizuka et al. | 528/388 |
| 4,745,167 | 5/1988 | Iizuka et al. | 526/262 |

FOREIGN PATENT DOCUMENTS

| | | |
|---|---|---|
| 0226998 | 7/1981 | European Pat. Off. |
| 01103279 | 3/1984 | European Pat. Off. |
| 0244187 | 11/1987 | European Pat. Off. |
| 0256757 | 2/1988 | European Pat. Off. |
| 0344977 | 12/1989 | European Pat. Off. |
| 61-51034 | 3/1986 | Japan |

OTHER PUBLICATIONS

Abstracts of Japan, vol. 9, No. 88 (C-295) [1911] Aug. 3, 1985, "Production of Aromatic Sulfide Polymer", Appl. No. 58-164691.

Primary Examiner—John Kight, III
Assistant Examiner—D. V. C. Truong
Attorney, Agent, or Firm—Lowe, Price, LeBlanc & Becker

[57] ABSTRACT

Disclosed herein is a process for the production of a polyarylenesulfide, wherein an alkali metal sulfide is reacted with a dihalo-aromatic compound in an organic amide solvent. The process comprises causing at least one compound selected from the oxides and hydroxides of alkaline earth metals to exist in a proportion not less than 0.01 mole but less than 0.1 mole per mole of the alkali metal sulfide charged in the reaction system, and performing the reaction of the alkali metal sulfide and dihalo-aromatic compound while raising the temperature by at least two stages in the presence of water in an amount defined in a specific range. A high-molecular weight linear polyarylenesulfide can be provided without use of a crosslinking agent or a polymerization aid.

7 Claims, No Drawings

PROCESS FOR PRODUCTION OF POLYARYLENESULFIDES

FIELD OF THE INVENTION

This invention relates to a process for producing a polyarylenesulfide (hereinafter abbreviated as "PAS"), and more specifically to a process for producing a high-molecular weight linear PAS having a melt viscosity of at least about 500 poise as measured at 310° C. and a shear rate of 200 sec$^{-1}$ without use of a crosslinking agent or an organic acid salt as a polymerization aid.

BACKGROUND OF THE INVENTION

In recent years, highly heat-resistant thermoplastics are increasingly demanded in a wide variety of fields including parts such as those for electronic instruments and motor vehicles.

PAS represented by poly(p-phenylenesulfide) (hereinafter abbreviated as "PPS") attracts attention as an engineering plastic having good heat resistance. However, it has been difficult to stably provide high-molecular weight linear PAS by conventional production processes. Consequently, this situation gives rise to the problem of difficulty in obtaining, in particular, fibers and films for which high strength is required or molded articles for which high impact strength is required.

As a typical process for producing PAS, there is a process wherein a dihalo-aromatic compound is reacted with sodium sulfide in an organic amide solvent such as N-methylpyrrolidone (U.S. Pat. No. 3,354,129). However, the PAS produced by this process has low molecular weight and melt viscosity, and it is difficult to fabricate it into a film, sheet or fibers.

Under such a state of the art, various proposals have been made to improve the process as mentioned above in order to obtain PAS with higher polymerization degree.

For example, it has been proposed to use an alkali metal carboxylate as a polymerization aid in the above reaction system (U.S. Pat. No. 3,919,177). According to this process, it is necessary to use the polymerization aid in an amount substantially equimolar to the alkali metal sulfide. Further, for obtaining PAS with higher polymerization degree, an expensive lithium acetate or sodium benzoate is required for use. This requirement results in increased production cost of PAS, resulting in commercial disadvantage. Also, according to this process, a large amount of organic acid may be entrained in the disposed waste water during recovery of PAS, whereby problems in pollution may be caused. For prevention of such problems, enormous costs are undoubtedly necessary.

It has also been proposed to use a trivalent or higher polyhalo-aromatic compound as a crosslinking agent or a branching agent (U.S. Pat. No. 4,116,947, etc.). According to this process, it is possible to obtain a high-melt viscosity PAS. However, since this PAS is not a linear polymer, but a polymer crosslinked or branched to a high degree, it has poor fiber-forming property, and it is difficult to form it into films or fibers. Also, even if molded or formed articles could be obtained, there is still the problem of their being mechanically extremely fragile because their molecular chains are basically short.

The present inventors previously carried out an investigation with respect to a process for cheaply producing a high-molecular weight PAS without use of a polymerization aid such as an alkali metal carboxylate, and studied in detail on the mechanism of polymerization reaction of an alkali metal sulfide and a dihalo-aromatic compound. As a result, it was found that a linear PAS of a high molecular weight with a melt viscosity of 1,000 poise or higher as measured at 310° C. and a shear rate of 200 sec$^{-1}$ can be readily produced without use of an aid by using a two-step polymerization process and changing, in particular, the water content and polymerization temperature among various polymerization conditions to a significant extent between preliminary and final stages of polymerization (U.S. Pat. No. 4,645,826).

However, in conventional polymerization processes including this two-step process, when a reactor made of a general-purpose material such as stainless steel was used as a polymerization reactor, it was necessary to strictly control the water content in the initial stage of the polymerization within a relatively narrow range of, for example, 0.5–2.4 moles per mole of an alkali metal sulfide charged in order to obtain a high-viscosity PAS and avoid the decomposition of the PAS formed. On the other hand, alkali metal sulfides commercially available as industrial materials are generally salts containing a large amount of water, such as trihydrates, pentahydrates or nonahydrates. It was necessary to dehydrate and remove an excess amount of water from the salt t be used prior to initiation of the polymerization reaction to strictly control the water content of the salt.

The present inventors made a further investigation with a view toward omitting or reducing the energy, equipment, time, process complexity, etc. which are required for such a dehydration process. As a result, it was found that when a reactor at least a portion of which, said portion being brought into contact with the reaction mixture, is made of titanium, is used, a high-melt viscosity PAS can be easily obtained even if the water content is relatively high upon the preliminary polymerization (U.S. Pat. No. 4,745,167). However, since the polymerization system became somewhat unstable though the dehydration process could be omitted, it was necessary to conduct the preliminary polymerization for a long period of time at a low temperature in order to avoid an decomposition reactions during the polymerization.

Alternatively, it has been proposed to cause the oxide or hydroxide of an alkaline earth metal to exist in the reaction system in the production process of PAS (Japanese Patent Application Laid-Open No. 51034/1 986 and U.S. Pat. No. 3,869,433). However, these processes require the addition of the hydroxide or the like in a relatively large amount. Therefore, when these processes were applied to the two-step polymerization process for producing particles of a high-molecular weight PAS, it was difficult to remove fully the remaining alkaline earth metal ion or the like from the PAS recovered after completion of the polymerization reaction, resulting in an adverse influence on physical properties such as clarity. In addition, in these known processes, the resulting polymers indeed tend to adhere to the wall surface of a reactor and a stirrer. They hence encounter difficulties in processing and in providing polymer particles with uniform particle size.

OBJECTS AND SUMMARY OF THE INVENTION

It is an object of this invention to provide a process for producing a high-molecular weight linear PAS stably at low cost.

Another object of this invention is to provide a particulate PAS, which is high in quality and has a uniform particle size.

The present inventors have carried out an extensive investigation with a view toward overcoming the above-described problems of the prior art. As a result, it has been found that a high-molecular weight linear PAS having a melt viscosity of at least about 500 poise as measured at 310° C. and a shear rate of 200 sec$^{-1}$ can be economically produced by causing the oxide and/or hydroxide of an alkaline earth metal to exist in a specified small amount in the reaction system in a PAS production process in which an alkali metal sulfide is reacted with a dihalo-aromatic compound in an organic amide solvent, and performing the reaction through specific two-step reaction processes.

According to this process, PAS can be obtained as a particulate polymer having a uniform particle size. In addition, since the oxide and/or hydroxide of the alkaline earth metal is added in a small amount, it can be easily removed by washing upon the recovery of the PAS, thereby providing a polymer high in quality.

It has also been found that according to this process, the stability of the reaction system is securable, and hence it is possible to avoid the decomposition of the resulting PAS even when the water content upon initiation of the reaction is not strictly controlled within a narrow range as heretofore, and moreover the deterioration of the organic amide solvent is prevented. Therefore, it is possible to use sodium sulfide trihydrate, sodium sulfide pentahydrate, etc., which are commercially-available industrial materials, without subjecting them to a dehydration process, resulting in shortened polymerization time and simplified processing.

Further, it has been found that the reaction according to this process can be performed more stably by using a reactor at least a portion of which, said portion being brought into contact with the reaction mixture, is made of a corrosion-resistant material such as titanium.

The present invention has been led to completion on the basis of these findings.

According to the present invention, there is thus provided a process for the production of a polyarylenesulfide, in which an alkali metal sulfide is reacted with a dihalo-aromatic compound in an organic amide solvent, which comprises causing at least one compound selected from the oxides and hydroxides of alkaline earth metals to exist in a proportion not less than 0.01 mole but less than 0.1 mole per mole of the alkali metal sulfide charged in the reaction system, and performing the reaction of the alkali metal sulfide and dihalo-aromatic compound through the following at least two steps:

First step a step comprising reacting the alkali metal sulfide with the dihalo-aromatic compound in the presence of water in a proportion of 0.5–10 moles per mole of the alkali metal sulfide charged at a temperature of 180°–235° C. until the conversion of the dihalo-aromatic compound becomes at least 50 mole %; and Second step a step comprising controlling the total water content in the reaction system to 1.8–10 moles per mole of the alkali metal sulfide charged by adding water to the reaction system or without addition of water, and raising the temperature to 245°–290° C. to continue the reaction.

DETAILED DESCRIPTION OF THE INVENTION

Production Process of PAS

The process for the production of a PAS according to the present invention comprises performing the reaction of an alkali metal sulfide with a dihalo-aromatic compound in the presence of the oxide and/or hydroxide of an alkaline earth metal in an extremely small amount defined in an organic amide solvent under the specific reaction conditions.

The alkali metal sulfide to be used in the present invention includes lithium sulfide, sodium sulfide, potassium sulfide, rubidium sulfide, cesium sulfide and mixtures thereof.

These alkali metal sulfides can be used as hydrates or aqueous mixtures, or in anhydrous forms.

In particular, if these alkali metal sulfides are salts containing water in a suitable range not more than 10 moles per mole, they have an advantage in that the dehydration process prior to the polymerization can be omitted. Such salts are salt hydrates containing water in proportions of 1.8–10 moles, preferably 2.0–6 moles, more preferably 2.4–5 moles per mole.

Among these alkali metal sulfides, sodium sulfide is the least expensive and is hence industrially preferred.

It may also be possible to add a small amount of an alkali metal hydroxide to the reaction system to convert an alkali metal bisulfide or the like, which may sometimes exist in a minute amount as an impurity in an alkali metal sulfide, into a sulfide.

Crystalline sodium sulfide pentahydrate is the best among commercially-available alkali metal sulfides in that it is an industrial material containing the least amount of impurities.

Dihalo-aromatic compound

As exemplary dihalo-aromatic compounds to be used in the present invention, may be mentioned p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl and the like. Among these, those composed mainly of a p-dihalobenzene, typically p-dichlorobenzene, are preferred.

These dihalo-aromatic compounds may be used either singly or in combination. By appropriate selection and combination thereof, a copolymer containing two or more different reaction units can be obtained. The copolymer may be a block copolymer in addition to a random copolymer.

Further, a monohalo compound may be suitably added to the polymerization reaction system in order to form the terminals of a resulting PAS or to control the polymerization reaction or the molecular weight of the PAS.

In addition, a small amount of a crosslinking agent such as a trihalobenzene may be added within a range which will not impair the processability and physical properties of the PAS formed.

Polymerization solvent

As exemplary organic amide solvents to be used in the polymerization reaction of the present invention, may be mentioned N-methylpyrrolidone, N-ethylpyrrolidone, tetramethylurea, hexamethylphosphoric triamide, 1,3-dimethyl -2-imidazolidinone and mixtures thereof. Among these, N-methylpyrrolidone is particularly preferred.

The amount of the organic amide solvent to be used preferably falls within a range of 0.3-2 kg per mole of the alkali metal sulfide charged.

Oxide and hydroxide of alkaline earth metal

As exemplary oxides and hydroxides of alkaline earth metals to be used in the present invention, may be mentioned calcium oxide, magnesium oxide, calcium hydroxide, barium hydroxide, magnesium hydroxide and the like. Among these, calcium oxide, calcium hydroxide and barium hydroxide are preferred.

These compounds may be used either singly or in combination and added to the reaction system in a proportion not less than 0.01 mole but less than 0.1 mole, preferably not less than 0.02 mole but less than 0.08 mole, more preferably not less than 0.02 mole but less than 0.06 mole, per mole of the alkali metal sulfide charged.

Any amounts less than 0.01 mole are too small to sufficiently exhibit the effect to stabilize the reaction system. On the other hand, any amounts exceeding 0.1 mole cause difficulty in removing the same after completion of the polymerization reaction and deteriorate the physical properties such as clarity of the polymer formed. In addition, the addition of such a greater amount results in PAS particles whose sizes are uneven, and also causes a phenomenon that the polymer formed adheres to the inner wall of a reactor and a stirrer.

The oxide and/or hydroxide of the alkaline earth metal is added to the reaction system before the first step or second step of the polymerization reaction or during the polymerization reaction. Usually, it is preferable to add it before the first step, namely, prior to initiation of the polymerization reaction, from the viewpoints of the easiness of processing and the physical properties of a resulting PAS.

It is desirable that the oxide and/or hydroxide of the alkaline earth metal should be used in the form of powder as fine as possible in order to make it take part in the polymerization reaction with effect.

If the alkaline earth metal hydroxide is used, its aqueous solution may be added. If the alkaline earth metal hydroxide is difficult to dissolve in water, an aqueous solution of an inorganic salt of its corresponding alkaline earth metal, which is easy to dissolve in water, and an aqueous solution of caustic soda may be separately added to the reaction system to form the hydroxide in situ. For example, aqueous solutions of calcium chloride and caustic soda may be separately added in place of the addition of calcium hydroxide. In this case, needless to say, the amounts of water added as the solutions must be taken into consideration when the amount of water to the alkali metal sulfide is determined as described below.

Reactor

It is desirable that the reactor to be used in the present invention should be made of a material which does not exert adverse influence such as decomposition on the reaction mixture and is excellent in corrosion resistance. It is particularly preferable to use a reactor at least a portion of which, said portion being brought into contact with the reaction mixture, is made of titanium.

Here, the reactor at least a portion of which, said portion being brought into contact with the reaction mixture, is made of titanium means a reactor at least a portion of which, said portion being brought into contact with the reaction mixture at all times, is constructed by titanium. The reactor constructed by titanium may include both reactors in which the portions coming into contact with the reaction mixture were made of titanium and a metal (iron, stainless steel or the like) coated with titanium. Needless to say, titanium may be applied to portions other than the portion coming into contact with the reaction mixture, for example, attendant piping, or to the whole reactor.

When the reaction is performed in the reactor making use of titanium, a decomposition reaction is significantly reduced compared with the case making use of a reactor made of stainless steel or the like.

Polymerization reaction

In the present invention, the reaction is performed by causing the oxide and/or hydroxide of the alkaline earth metal to exist in a proportion not less than 0.01 mole but less than 0.1 mole per mole of the alkali metal sulfide charged in the reaction system, and preferably using the reactor making use of titanium at least in part. It is however essential t conduct the polymerization reaction through the following at least two steps.

The term "at least two steps" as used herein means that a supplemental step may be added before the first step or after the second step or between both steps so long as the effect of this invention, which is attributable to the combination of these two steps, is feasible.

First step

In the first step (preliminary polymerization), the reaction is carried out in the presence of water in a proportion of 0.5-10 moles per mole of the alkali metal sulfide charged at a temperature of 180°-235° C. until the conversion of the dihalo-aromatic compound becomes at least 50 mole %.

In this step, the oxide and/or hydroxide of the alkaline earth metal is preferably caused to exist generally in a proportion not lower than 0.01 mole but lower than 0.1 mole per mole of the alkali metal sulfide charged.

In practicing the process, first, an alkali metal sulfide, a dihalo-aromatic compound and the oxide and/or hydroxide of an alkaline earth metal are added into an organic solvent at a temperature ranging from room temperature to 130° C., desirably in an inert gas atmosphere, and the temperature is elevated to a desired temperature at which the reaction is carried out.

The amount of the co-existing water in the polymerization reaction system in the first step is controlled within a range of 0.5-10 moles per mole of the alkali metal sulfide charged.

At a level less than 0.5 mole, undesirable reactions such as decomposition of the PAS formed will occur. On the other hand, at a level exceeding 10 moles, the polymerization rate will become markedly smaller. Thus, any amounts outside the above range are not desirable.

The water content within the range of 1.0-6 moles is particularly preferred because a high-molecular weight PAS is easy to obtain. Further, when the amounts of the co-existing water in the first and second steps are controlled to 2.4-6 moles per mole of the alkali metal sulfide charged, there can be obtained a particulate PAS having a relatively great apparent specific gravity of at least 0.30 g/cc and an average particle size not smaller than about 0.2 mm but not larger than about 2 mm, usually, not smaller than about 0.3 mm but not larger than about 1 mm, the PAS having said average particle size being easy to handle after that.

If the water content in the alkali metal sulfide to be used is more than the desired content, the amount of the co-existing water is controlled by conducting dehydration prior to the reaction. On the other hand, if the water content in the alkali metal sulfide is less than the desired content, the necessary amount of water is added for supplementation.

If the water content in the alkali metal sulfide to be used is within the desired range of the co-existing water, it is unnecessary to dehydrate in advance. In particular, according to the present invention, the range of the co-existing water upon initiation of the polymerization reaction can be enlarged to a range wider than the conventional range owing to the stabilized reaction system. Therefore, when an alkali metal sulfide hydrate containing water in a proportion of 1.8–10 moles per mole of the alkali metal sulfide is used as the alkali metal sulfide, it has no need to be subjected to a dehydration process in advance. Accordingly, by the use of such a compound, it is possible to avoid complication of the processing and to shorten the polymerization time as a whole.

The amount of the dihalo-aromatic compound to be used is generally within the range of 0.95–1.30 moles, preferably 0.98–1.15 moles per mole of the alkali metal sulfide charged. Any amounts outside the above range make it difficult to obtain a high-molecular weight PAS.

The polymerization reaction in the first step is conducted at a temperature of 180°–235° C. At a temperature lower than 180° C., the reaction rate is too slow, while at a temperature over 235° C., the PAS formed is liable to be decomposed to produce only a PAS low in melt viscosity.

The reaction in the first step is continued until the conversion of the dihalo-aromatic compound reaches at least 50 mole %.

With a conversion less than 50 mole %, undesirable reactions such as decomposition may occur in the second step (final polymerization).

A conversion of 80–98 mole% is preferable with 90–98 mole% being more preferred.

Here, the conversion of a dihalo-aromatic compound is calculated in accordance with the following equation.

(a) In the case when a dihalo-aromatic compound (abbreviated as "DHA") is added in excess of an alkali metal sulfide in terms of molar ratio:

Conversion =

$$\frac{DHA \text{ charged (moles)} - \text{Residual } DHA \text{ (moles)}}{DHA \text{ charged (moles)} - \text{Excessive } DHA \text{ (moles)}} \times 100$$

(b) In other cases than (a):

Conversion =

$$\frac{DHA \text{ charged (moles)} - \text{Residual } DHA \text{ (moles)}}{DHA \text{ charged (moles)}} \times 100$$

Second step

In the second step (final polymerization), the total water content in the polymerization system is controlled to 1.8–10 moles per mole of the alkali metal sulfide charged by either leaving the water content in the first step (preliminary polymerization) intact or adding water to the slurry obtained in the preliminary polymerization, and a polymerization temperature is raised to 245°–290° C. to carry out polymerization.

By the final polymerization, a high-molecular weight PAS having a high melt viscosity can be obtained.

When the proportion of the co-existing water in the first step is controlled to at least 1.8 moles per mole of the alkali metal sulfide charged, it is not always necessary to add water for supplementation in the second step, resulting in simplified polymerization process.

If the total water content in the reaction system is either lower than 1.8 moles or more than 10 moles, the melt viscosity of the PAS formed will be lowered. In particular, the final polymerization is preferably conducted with a total water content ranging from 2.0 moles to 6 moles since then a PAS with a high melt viscosity can easily be obtained.

Furthermore, when water is not added for supplementation in the second step, and the amounts of the co-existing water in both first and second steps are controlled ed to 2.4–6 moles per mole of the alkali metal sulfide charged as described above, there can be obtained a particulate PAS having a relatively great apparent specific gravity of at least 0.30 g/cc and an average particle size not smaller than about 0.2 mm but not larger than about 2 mm, usually, not smaller than about 0.3 mm but not larger than about 1 mm, the PAS having said average particle size being easy to handle after that, with good processability.

Moreover, when the polymerization temperature is lower than 245° C., only a PAS having a low melt viscosity can be obtained. On the other hand, if it exceeds 290° C., there is a potential problem that the PAS formed or the polymerization solvent is decomposed. Particularly, the range of from 250° C. to 270° C. is preferred since a high-melt viscosity PAS can be obtained with ease.

The final polymerization in the present invention is not a simple fractionation-granulation process of the PAS formed in the preliminary polymerization, but a process required for a further polymerization of the PAS formed in preliminary polymerization, by which the melt viscosity is increased to a significant extent.

Accordingly, the time required for the final polymerization is of the order of 0.5–30 hours from the viewpoint of increase in melt viscosity. If the polymerization time is too short, only a PAS having a low melt viscosity can be obtained. On the contrary, if the time is too long, decomposition may occur in the reaction system. Thus, the polymerization time is preferably 1–20 hours with 3–15 hours being particularly preferred.

The reaction in the second step is preferably conducted until the conversion of the dihalo-aromatic compound in the reaction system reaches at least 98 mole %, preferably at least 99 mole %.

Changing from the preliminary polymerization to the final polymerization may be done either by transferring the slurry obtained in the preliminary polymerization to another reaction vessel or by changing polymerization conditions in the same reaction vessel.

The time at which water is added in the second step to control the amount of the co-existing water may be before initiation of the temperature elevation to the temperature for the final polymerization, in the course of the temperature elevation, or immediately after elevation to the temperature for the final polymerization. When water is added before initiation of the temperature elevation, the best result can be attained.

Recovery

The recovery of the PAS in the polymerization process according to the present invention can be carried out by a method known per se in the art. For example, after completion of the polymerization reaction of the final polymerization, the reaction mixture in the slurry cooled can be filtered as such without dilution or after dilution with water or the like, the resulting polymer being washed with water and filtered repeatedly, dehydrated or dried, thereby recovering a PAS.

Incidentally, in the present invention, the oxide and/or hydroxide of the alkaline earth metal is used with a view toward stabilizing the polymerization reaction system and obtaining a high-molecular weight PAS. Therefore, the PAS recovered is generally washed to remove such a compound. In view of this point, the process of the present invention is entirely different from the processes in which the PAS recovered is treated with an alkaline earth metal hydroxide or the like (for example, U.S. Pat. No. 4,373,091, EP 103279 and U.S. Pat. No. 4,588,789).

PAS Formed

The PAS obtainable in accordance with the process of this invention has a high molecular weight and a high melt viscosity and is substantially linear. It can hence be processed and formed easily into tough films, sheets, fibers, etc. having good heat resistance. Also, the PAS can be subjected to injection molding, extrusion, rotational molding or the like to process it into various molded or formed products.

The PAS according to the present invention can be used as a composition mixed with at least one of powdery fillers such as carbon black, calcium carbonate powder, silica powder and titanium oxide powder, and fibrous fillers such as carbon fiber, glass fiber, asbestos and polyaramide fiber.

Further, the polymer of the present invention can also be used as a composition mixed with at least one of synthetic resins such as polycarbonate, polyphenylene oxide, polysulfone, polyarylene, polyacetal, polyimide, polyamide, polyester, polystyrene and ABS.

ADVANTAGES OF THE INVENTION

According to the present invention, there is provided a process for producing a high-molecular weight linear PAS stably without substantial decomposition during polymerization and at low cost. Further, this invention also permits the provision of a particulate PAS high in quality and uniform in particle size.

According to the process of this invention for the production of PAS, in particular, the following extremely distinguished advantages can be attained:

(1) since the polymerization reaction system is stabilized, it is unnecessary to strictly control the amount of the co-existing water upon initiation of the reaction within a narrow range;

(2) even when a commercially-available alkali metal sulfide hydrate is used, its dehydration can be omitted if desired;

(3) the deterioration of the expensive organic amide solvent can be prevented;

(4) since the oxide and/or hydroxide of the alkaline metal is added only in an extremely small amount defined, it can be easily removed upon the recovery of the PAS and hence it does not adversely affect the physical properties of the polymer;

(5) the polymer formed does not adhere to the reactor and a particulate PAS having a uniform particle size can be obtained with good processability;

(6) since no expensive polymerization aid is required and the polymerization reaction can be carried out in a relatively short period of time, the present invention has a great economical significance; and (7) a high-molecular weight linear PAS can be obtained in the form of particles relatively great in apparent specific gravity.

EMBODIMENTS OF THE INVENTION

The present invention will hereinafter be described more specifically by the following examples and comparative examples. It should however be borne in mind that this invention is not limited t the following examples only.

Determination of stability of polymer system

In order to determine the degree of stability of each polymer system, the supernatant liquid of each final polymerization slurry was subjected to a Shimazu spectro-photometer (manufactured by Shimazu Seisakusho K.K.) to measure its spectral transmittance at a wavelength of 480 nm. The spectral transmittance was expressed in terms of relative evaluation based on the assumption that the value as to N-methyl-2-pyrrolidone (hereinafter abbreviated as "NMP") used as a polymerization solvent is 100%. The spectral transmittance of the supernatant liquid becomes lower as products by side reactions increase because of unstable polymerization system. When the spectral transmittance of the supernatant liquid is at least 70%, preferably at least 75%, it can be evaluated that the polymerization reaction was caused to progress stably.

Measurements of average particle size and apparent specific gravity

The average particle size and apparent specific gravity were measured in accordance with JIS K 0069 "Dry-Sieve Method" and JIS K 6721, respectively.

EXAMPLES 1

First step (preliminary polymerization)

A 20-l titanium-lined autoclave was charged with 7,200 g of NMP, 3,800 g (22.50 moles as $Na_2S$) of $Na_2S \cdot 5H_2O$ crystals containing 46.20 wt. % of sodium sulfide ($Na_2S$) and 83.4 g (0.05 mole/mole of $Na_2S$) of calcium hydroxide, and the temperature of the system was elevated with stirring in a nitrogen atmosphere up to about 175° C. to distill off 1,865 g of distillates ($H_2S$ =0.34 mole, NMP =642 g, $H_2O$ =1211.4 g). The system was then cooled to 100° C., and 3322.9 g (1.02 moles/mole of $Na_2S$) of p-dichlorobenzene (hereinafter abbreviated as "p-DCB"), 4,522 g of NMP and 403.5 g of deionized water were added (co-existing water: about 2.1 moles/mole $Na_2S$). The resultant mixture was heated in a nitrogen atmosphere up to 220° C. to react them for 10 hours.

The conversion of p-DCB in the preliminary polymerization and the melt viscosity of the polymer formed were measured in accordance with the following methods, respectively.

A small amount of the polymerization slurry was sampled to determine the residual p-DCB content in the slurry by gas chromatography, from which the conversion of p-DCB in the preliminary polymerization was determined in accordance with the above equation (a) for calculation of conversion. The conversion was found to be 95.4%.

A portion of the sample slurry was then filtered under reduced pressure as is to remove liquid components. The solid thus obtained was dispersed in a great amount of deionized water and the dispersion was then filtered again under reduced pressure to wash the polymer formed. After this operation was repeated three times, the washed polymer was dried at 100° C. for 5 hours (in air atmosphere) to obtain poly(p-phenylenesulfide) (PPS) powder. A press sheet was obtained by melt-pressing the powder for 30 seconds at 320° C. without pre-heating. The melt viscosity of the press sheet was measured by using a Koka type flow tester (manufactured by Shimazu Seisakusho K.K.) at 310° C. (preheating: 5 minutes). The melt viscosity calculated by extrapolating to a shear rate of 200 sec$^{-1}$ was at most 10 poise.

Second step (final polymerization)

After completion of the first step, the reaction system was heated up to 255° C. without adding water to react the reactants for 5 hours.

The conversion of p-DCB was found to be 99.2%.

After cooling the reaction system, the resulting PPS in a white granular form was separated from NMP, side-reaction products, oligomers, etc. by screening through a screen with a mesh size of 0.1 mm. The thus-separated PPS was then washed with deionized water repeatedly and then dried at 100° C. for 5 hours. The yield of the thus-obtained PPS was found to be 83.6%.

The polymer thus obtained had an average particle size of 0.34 mm and an apparent specific gravity of 0.25 g/cc.

The term "yield" as used herein means the percentage of the PPS recovered to the amount (calculated amount) based on the assumption that all sodium sulfide charged have been converted into PPS.

Its melt viscosity was found to be 900 poise as measured in accordance with the same measuring method as in the polymer formed in the preliminary polymerization.

The spectral transmittance of the supernatant liquid of the final polymerization slurry was measured in order to determine the degree of stability of the polymerization system. As a result, it was found to be 81.4% in terms of the relative evaluation based on the assumption that the value of NMP is 100%.

EXAMPLE 2

In accordance with substantially the same procedure as in the preliminary polymerization in Example 1, a 20-l titanium-lined autoclave was charged with 7,200 g of NMP and 3,800 g (22.50 moles as $Na_2S$) of $Na_2S\cdot 5\text{-}H_2O$ crystals containing 46.20 wt. % of sodium sulfide ($Na_2S$) and then, the contents in the autoclave were adjusted so as to give a p-DCB/$Na_2S$ molar ratio of 1.015, a $Ca(OH)_2$/$Na_2S$ molar ratio of 0.04 and a water content of 2.7 moles/mole of $Na_2S$. Under the above conditions, polymerization was conducted in a nitrogen atmosphere at 220° C. for 10 hours.

The conversion of p-DCB in the preliminary polymerization was 96.3% and the melt viscosity of the polymer formed was at most 10 poise.

Then, the reaction system was heated up to 255° C. without adding water to react the reactants for 5 hours. The conversion of p-DCB after completion of the final polymerization wa found to be 99.8%. A PPS recovered by the same treatment as in Example 1 was in a white granular form having an average particle size of 0.41 mm, and its yield, apparent specific gravity and melt viscosity were found to be 86.4%, 0.33 g/cc and 1,250 poise, respectively.

In addition, the spectral transmittance of the supernatant liquid of the final polymerization slurry was 80.8% at a wavelength of 480 nm.

EXAMPLE 3

In accordance with substantially the same procedure as in the preliminary polymerization in Example 1, a 20-l titanium-lined autoclave was charged with 7,200 g of NMP and 3,800 g (22.50 moles as $Na_2S$) of $Na_2S\cdot 5\text{-}H_2O$ crystals containing 46.20 wt. % of sodium sulfide ($Na_2S$) and then, the contents in the autoclave were adjusted so as to give a p-DCB/$Na_2S$ molar ratio of 1.03, a $Ca(OH)_2$/$Na_2S$ molar ratio of 0.04 and a water content of 2.8 moles/mole of $Na_2S$. Under the above conditions, polymerization was conducted in a nitrogen atmosphere at 220° C. for 10 hours.

The conversion of p-DCB in the preliminary polymerization was 95.3% and the melt viscosity of the polymer formed was at most 10 poise.

Then, the reaction system was heated up to 255° C. without adding water to react the reactants for 5 hours. The conversion of p-DCB after completion of the final polymerization was found to be 99.2%. A PPS recovered by the same treatment as in Example 1 was in a white granular form having an average particle size of 0.38 mm, and its yield, apparent specific gravity and melt viscosity were found to be 87.2%, 0.35 g/cc and 1,170 poise, respectively. In addition, the spectral transmittance of the supernatant liquid of the final polymerization slurry was 82.8% at a wavelength of 480 nm.

EXAMPLE 4

In accordance with substantially the same procedure as in the preliminary polymerization in Example 1, a 20-l titanium-lined autoclave was charged with 7,200 g of NMP and 3,800 g (22.50 moles as $Na_2S$) of $Na_2S\cdot 5\text{-}H_2O$ crystals containing 46.20 wt. % of sodium sulfide ($Na_2S$) and then, the contents in the autoclave were adjusted so as to give a p-DCB/$Na_2S$ molar ratio of 1.015, a $Ca(OH)_2$/$Na_2S$ molar ratio of 0.04 and a water content of 2.1 moles/mole of $Na_2S$. Under the above conditions, polymerization was conducted in a nitrogen atmosphere at 220° C. for 10 hours.

The conversion of p-DCB in the preliminary polymerization was 97.0% and the melt viscosity of the polymer formed was at most 10 poise.

Then, the reaction system was heated up to 255° C. without adding water to react the reactants for 5 hours, and then react further for 3 hours at 245° C.

The conversion of p-DCB after completion of the final polymerization was found to be 99.7%. A PPS recovered by the same treatment as in Example 1 was in a white granular form having an average particle size of 0.44 mm, and its yield, apparent specific gravity and melt viscosity were found to be 83.8%, 0.28 g/cc and 1,400 poise, respectively.

In addition, the spectral transmittance of the supernatant liquid of the final polymerization slurry was 79.8% at a wavelength of 480 nm.

Furthermore, the crystallization temperature of the PPS was measured using the press sheet formed upon the measurement of the melt viscosity.

The measurement of the crystallization temperature ($T_{CM}$) was performed in a "DSC 2 O " (Differential Scanning Calorimeter manufactured by Mettler Instrumente AG) using the sample sheet. Described specifically, 10 mg of the sample sheet was cooled from 340° C. at a rate of 10° C./min in a nitrogen atmosphere, and the temperature corresponding to an exothermic peak of crystallization measured by the DSC was taken as $T_{CM}$. Its $T_{CM}$ was 242.3° C.

From the results of Examples 1 through 4, which have been described above, it was found that when the water contents in both first and second steps are less than 2.4 moles per mole of $Na_2S$ (Examples 1 and 4), the apparent specific gravities of the resultant polymers become 0.30 g/cc or smaller, thereby giving some trouble on handling upon processing.

EXAMPLE 5

A 1-l titanium-lined autoclave was charged with 500 g of NMP, 128.5 g (1.00 mole, water content: about 2.8 moles) of $Na_2S.3H_2O$ containing 60.73 wt. % of $Na_2S$, 3.7 g (0.05 mole/mole of $Na_2S$) of calcium hydroxide, 2.0 g of sodium hydroxide serving to neutralize NaSH contained in the sodium sulfide and 150.0 g (1.02 moles/mole of $Na_2S$) of p-DCB, and the temperature of the system was held with stirring in a nitrogen atmosphere at 180° C. for 2 hours without dehydrating the sodium sulfide, and then elevated up to 220° C. to react the reactants for 10 hours.

The conversion of p-DCB in the preliminary polymerization was 94.8% and the melt viscosity of the polymer formed was at most 10 poise.

Then, the reaction system was heated up to 255° C. without adding water to react the reactants for 5 hours. Thereafter, the reaction mixture was treated in the same manner as in Example 1. The conversion of p-DCB after completion of the final polymerization was found to be 98.8%, and the yield of the polymer formed was 62%. Its melt viscosity, average particle size and apparent specific gravity were found to be 650 poise, 0.58 mm and 0.36 g/cc respectively.

In addition, the spectral transmittance of the supernatant liquid of the final polymerization slurry was 79.6% at a wavelength of 480 nm.

EXAMPLE 6

A polymerization reaction was performed in the same manner as in Example 5 except that 3.7 g of calcium hydroxide was added after completion of the preliminary polymerization but before initiation of the final polymerization.

The conversion of p-DCB were 95.6% after completion of the preliminary polymerization and 99.0% after completion of the final polymerization. The yield, melt viscosity, average particle size and apparent specific gravity of the polymer finally formed were 49%, 510 poise, 0.50 mm and 0.36 g/cc, respectively.

In addition, the spectral transmittance of the supernatant liquid of the final polymerization slurry was 77.4% at a wavelength of 480 nm.

COMPARTIVE EXAMPLE 1

A polymerization reaction was performed in the same manner as in Example 5 except that no calcium hydroxide was used. The conversion of p-DCB were 95.6% after completion of the preliminary polymerization and 98.9% after completion of the final polymerization.

In the reaction system, a PPS formed was decomposed and had an thiophenolic odor. Therefore, the recovery of the polymer was given up. The spectral transmittance of the supernatant liquid of the final polymerization slurry was 5% at a wavelength of 480 nm.

From the results of Examples 5 and 6 and Comparative Example 1, it may safely be said that the addition of the oxide and/or hydroxide of the alkaline earth metal according to the present invention should be done before initiation of the polymerization reaction o during the polymerization reaction. Its addition after completion of the polymerization reaction will result in an inferior polymer. The addition of the oxide and/or hydroxide after the polymer formed is decomposed during polymerization is ineffective. It is also understood by comparison of Examples 5 and 6 that the addition of calcium hydroxide before initiation of the polymerization reaction (before the preliminary polymerization) is more effective than the addition in the course of the polymerization reaction.

COMPARATIVE EXAMPLE 2

A polymerization reaction was performed in exactly the same manner as in Example 5 except that calcium hydroxide was added in an amount of 74.1 g (1.0 mole/mole of $Na_2S$) which is 20 times as much as the amount in Example 5.

The conversion of p-DCB were 93.6% after completion of the preliminary polymerization and 98.2% after completion of the final polymerization.

The resultant polymer was not in a granular form, most of which adhered t the wall surface of the reactor and the stirrer. The other one was in a particulate form irregular in size, including mass of from about several millimeters to about 1 centimeter in diameter.

The spectral transmittance of the supernatant liquid of the final polymerization slurry was 81.5% at a wavelength of 480 nm.

The massive polymer was ground by a mixer to at most 1 mm in diameter and then treated in the same manner as in Example 1. The resulting polymer was hot-pressed at 320° C. The formed sheet had a gray color and was opaque due to incomplete removal of calcium hydroxide.

COMPARATIVE EXAMPLE 3

A polymerization reaction was performed in exactly the same manner as in Example 5 except that calcium hydroxide was added in an amount of 7.41 g (0.1 mole/mole of $Na_2S$) which is twice as much as the amount in Example 5.

The conversion of p-DCB were 94.2% after completion of the preliminary polymerization and 98.4% after completion of the final polymerization.

About four fifths of the resultant polymer was in a granular form, but the remaining about one fifth adhered massively to the wall surface of the reactor. The massive polymer was ground by a mixer to at most 1 mm in diameter to put together with the granular polymer, and then treated in the same manner as in Example 1.

The resulting polymer was hot-pressed at 320° C. The formed sheet was somewhat opaque due to incomplete removal of calcium hydroxide.

The yield, apparent specific gravity and melt viscosity of the polymer finally formed were 59%, 0.41 g/cc and 530 poise, respectively.

The spectral transmittance of the supernatant liquid of the final polymerization slurry was 80.7% at a wavelength of 480 nm.

From the results of Example 5 and Comparative Examples 2-3, it is understood that when the oxide and/or hydroxide of the alkaline earth metal is used in a greater amount, the polymer formed tends to become massive and often adheres to the reactor and stirrer. Therefore, it is difficult to remove the alkaline metal hydroxide used and the like in the post treatment process of the polymerization. In addition, delay in polymerization reaction was observed though it was a bit. The reason has not yet been clarified.

EXAMPLE 7

A 1-l titanium-lined autoclave was charged with 500 g of NMP, 128.5 g (1.00 mole, water content: about 2.8 moles) of $Na_2S \cdot 3H_2O$ containing 60.73 wt. % of $Na_2S$, 8.6 g (0.05 mole/mole of $Na_2S$) of barium hydroxide, 2.0 g of sodium hydroxide serving to neutralize NaSH contained in the sodium sulfide and 150.0 g (1.02 moles/mole of $Na_2S$) of p-DCB, and the temperature of the system was held with stirring in a nitrogen atmosphere at 180° C. for 2 hours without dehydrating the sodium sulfide, and then elevated up to 220° C. to react the reactants for 10 hours.

The conversion of p-DCB in the preliminary polymerization wa 95.9% and the melt viscosity of the polymer formed was at most 10poise.

Then, the reaction system was heated up to 255° C. without adding water to react the reactants for 5 hours. Thereafter, the reaction mixture was treated in the same manner as in Example 1. The conversion of p-DCB after completion of the final polymerization was found to be 98.9%, and the yield of the polymer formed was 69%. Its melt viscosity, average particle size and apparent specific gravity were found to be 650 poise, 0.51 mm and 0.37 g/cc, respectively.

In addition, the spectral transmittance of the supernatant liquid of the final polymerization slurry was 76.5% at a wavelength of 480 nm.

EXAMPLE 8

A 1-l titanium-lined autoclave was charged with 500 g of NMP, 84.79 g (0.50 mole, water content: about 2.54 moles) of $Na_2S \cdot 5H_2O$ containing 46.02 wt. % of $Na_2S$, 1.85 g (0.05 mole/mole of $Na_2S$) of calcium hydroxide and 5 76.71 g (1.03 moles/mole of $Na_2S$) of p-DCB, and the temperature of the system was elevated with stirring in a nitrogen atmosphere up to 210° C. without dehydrating the sodium sulfide to react the reactants for 20 hours.

The conversion of p-DCB in the preliminary polymerization was 94.1% and the melt viscosity of the polymer formed was at most 10 poise.

Then, the reaction system was heated up to 255° C. without adding water to react the reactants for 3 hours. Thereafter, the reaction mixture was treated in the same manner as in Example 1. The conversion of p-DCB after completion of the final polymerization was found to be 98.3%, and the yield of the polymer formed was 73%. Its melt viscosity, average particle size and apparent specific gravity were found to be 500 poise, 0.47 mm and 0.47 g/cc, respectively.

In addition, the spectral transmittance of the supernatant liquid of the final polymerization slurry was 77.8% at a wavelength of 480 nm.

We claim:

1. A process for the production of a polyarylene-sulfide, in which an alkali metal sulfide is reacted with a dihalo-aromatic compound in an organic amide solvent, which comprises causing at least one compound selected from the oxides and hydroxides of alkaline earth metals to exist in a proportion not less than 0.01 mole but less than 0.1 mole per mole of the alkali metal sulfide charged in the reaction system, and performing the reaction of the alkali metal sulfide and dihalo-aromatic compound through the following at least two steps:

First step
a step comprising reacting the alkali metal sulfide with the dihalo-aromatic compound in the presence of water in a proportion of 0.5-10 moles per mole of the alkali metal sulfide charged at a temperature of 180°-235° C. until the conversion of the dihalo-aromatic compound becomes at least 50 mole %; and Second step
a step comprising controlling the total water content in the reaction system to 1.8-10 moles per mole of the alkali metal sulfide charged by adding water to the reaction system or without addition of water, and raising the temperature to 245°-290° C. to continue the reaction.

2. The process as claimed in claim 1, wherein the reaction is carried out in a reactor at least a portion of which, said portion being brought into contact with the reaction mixture, is made of titanium.

3. The process as claimed in claim 1, wherein at least one compound selected from calcium oxide, calcium hydroxide and barium hydroxide is used as the oxide and/or hydroxide of the alkaline earth metal.

4. The process as claimed in claim 1, wherein an alkali metal sulfide hydrate containing water in a proportion of 1.8-10 moles per mole of the alkali metal sulfide is used as the alkali metal sulfide, and the reaction is carried out without dehydrating the alkali metal sulfide in advance.

5. The process as claimed in claim 1, wherein the water contents in the first and second steps are controlled to 2.4-6 moles per mole of the alkali metal sulfide charged.

6. The process as claimed in claim 1, wherein the conversion of the dihalo-aromatic compound in said first step is about 80-98 mole %.

7. The process as claimed in claim 1, wherein the first step comprises reacting the alkali metal sulfide with the dihalo-aromatic compound at a temperature of 180°-235° C. for about ten hours, and in the second step, the temperature of the reaction system is raised to 245°-290° C. for about five hours.

* * * * *

UNITED STATES PATENT AND TRADEMARK OFFICE
CERTIFICATE OF CORRECTION

PATENT NO. : 5,179,194
DATED : January 12, 1993
INVENTOR(S) : KAWAKAMI et al

It is certified that error appears in the above-indentified patent and that said Letters Patent is hereby corrected as shown below:

```
Column 2, line 29, change "salt t be" to --salt to be--.
Column 2, line 47, change "an" to --any--.
Column 6, line 26, change "t conduct" to --to conduct--.
Column 10, line 22, change "t the" to --to the--.
Column 12, line 7, change "wa found" to --was found--.
Column 13, line 8, change ""DSC 2 0"" to --"DSC 20"--.
Column 14, line 17, change "o during" to --or during--.
Column 14, line 39, change "t the" to --to the--.
Column 15, line 34, change "wa 95.9%" to --was 95.9%--.
```

Signed and Sealed this

Twenty-third Day of August, 1994

Attest:

BRUCE LEHMAN

*Attesting Officer*         *Commissioner of Patents and Trademarks*